(12) United States Patent
Song et al.

(10) Patent No.: US 11,489,440 B2
(45) Date of Patent: Nov. 1, 2022

(54) POWER FACTOR CORRECTION CIRCUIT (71) Applicant: Delta Electronics (Shanghai) Co., Ltd., Shanghai (CN)

(72) Inventors: Haibin Song, Shanghai (CN); Jian Zhou, Shanghai (CN); Qi Fu, Shanghai (CN); Daofei Xu, Shanghai (CN); Jinfa Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 121 days.

(21) Appl. No.: 17/146,471

(22) Filed: Jan. 11, 2021

(65) Prior Publication Data
US 2021/0367508 A1 Nov. 25, 2021

(30) Foreign Application Priority Data

May 22, 2020 (CN) .......................... 202020888717.5

(51) Int. Cl.
*H02M 1/42* (2007.01)
*H02M 1/32* (2007.01)
(Continued)

(52) U.S. Cl.
CPC ........... *H02M 1/4233* (2013.01); *H02M 1/32* (2013.01); *H02M 7/219* (2013.01); *H02M 1/0003* (2021.05)

(58) Field of Classification Search
CPC ...... H02M 1/4233; H02M 1/32; H02M 7/219; H02M 1/0003; H02M 1/0032; Y02P 80/10; Y02B 70/10
See application file for complete search history.

(56) References Cited

U.S. PATENT DOCUMENTS

2007/0115704 A1* 5/2007 Ito ...................... H02M 1/4241
363/125
2010/0259955 A1* 10/2010 Shimada ............... H02M 7/219
363/49
(Continued)

FOREIGN PATENT DOCUMENTS

CN 100431246 C 11/2008
CN 201146458 Y 11/2008
CN 104702093 B 6/2017

OTHER PUBLICATIONS

Wang Yifeng et al., "An Interleaved Totem-Pole Bridgeless Boost PFC Rectifier with Zero-Ripple Current Filter", Transactions of China Electrotechnical Society, vol. 26, No. 9, Sep. 2011.

Primary Examiner — Emily P Pham
Assistant Examiner — Htet Z Kyaw
(74) Attorney, Agent, or Firm — CKC & Partners Co., LLC (57) ABSTRACT

The present invention discloses a power factor correction circuit. The power factor correction circuit includes: a first bridge arm having a first switch and a second switch; a second bridge arm having a third switch and a fourth switch; a first inductor and a second inductor; a first capacitor and/or a second capacitor connected with a common point between the second inductor and the first inductor; and a third capacitor and/or a fourth capacitor, the third capacitor connected in parallel to the third switch based on an arrangement of the second capacitor and having a capacitance value same as that of the second capacitor, the fourth capacitor connected in parallel to the fourth switch based on an arrangement of the first capacitor and having a capacitance value same as that of the first capacitor.

20 Claims, 7 Drawing Sheets

(51) Int. Cl.
   *H02M 7/219*     (2006.01)
   *H02M 1/00*      (2006.01)

(56) References Cited

U.S. PATENT DOCUMENTS

| 2010/0309699 A1* | 12/2010 | Nishikawa | H02M 1/0085 |
| | | | 363/126 |
| 2013/0257392 A1* | 10/2013 | Yan | H02M 1/4266 |
| | | | 323/210 |

* cited by examiner

POWER FACTOR CORRECTION CIRCUIT

CROSS-REFERENCE TO RELATED APPLICATIONS

This non-provisional application claims priority under 35 U.S.C. § 119(a) on Patent Application No. 202020888717.5 filed in P.R. China on May 22, 2020, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

BACKGROUND OF THE INVENTION

Field of the Invention

The present invention relates to a power factor correction circuit, and particularly, to Totem-Pole power factor correction circuit.

Related Art

With the development trend of miniaturization, switching mode power supply must be high efficient for the sake of thermal dissipation. The traditional boost power factor correction (Boost PFC) circuit has large loss on the rectifier bridge, which occupies 20% or more of an overall loss of the switching mode power supply. How to reduce the loss of the rectifier bridge is essential for improving the efficiency of the switching mode power supply. Totem-Pole power factor correction (Totem-Pole PFC) circuit is widely used because the loss of the rectifier bridge is greatly reduced.

In the prior art, the filter circuit of the Totem-Pole PFC is generally arranged at AC input terminals and X-Cap must be used, which has very large size. In order to reduce the volume of the filter circuit, film capacitor can be used; one terminal of the film capacitor is coupled to the AC input terminals, and the other terminal of the film capacitor is coupled to the DC output terminals. However, when the output of the Totem-Pole PFC is under no-load or light-load, the voltage on the bus capacitor will be much higher than normal condition, which may result in explosion of the bus capacitor.

SUMMARY OF THE INVENTION

An object of the present invention is to provide a novel power factor correction circuit for solving the deficiencies of the prior art.

First aspect of the present invention is to provide a power factor correction circuit, the power factor correction circuit includes: a first AC terminal and a second AC terminal for receiving an AC voltage; a first DC terminal and a second DC terminal for providing a DC voltage; a first bridge arm comprising a first switch and a second switch connected in series, a first node between the first switch and the second switch electrically coupled to the first AC terminal through a first inductor; a second bridge arm comprising a third switch and a fourth switch connected in series, a second node between the third switch and the fourth switch electrically coupled to the second AC terminal, the first bridge arm and the second bridge arm connected in parallel between the first DC terminal and the second DC terminal; a second inductor having one terminal connected to the first AC terminal, and another terminal connected to the first inductor; a first capacitor and/or a second capacitor, the first capacitor having one end connected to a third node between the second inductor and the first inductor, and another end connected to the first DC terminal, the second capacitor having one end connected to the third node between the second inductor and the first inductor, and another end connected to the second DC terminal; and a third capacitor and/or a fourth capacitor, the third capacitor connected in parallel to the third switch based on an arrangement of the second capacitor and having a capacitance value same as that of the second capacitor, the fourth capacitor connected in parallel to the fourth switch based on an arrangement of the first capacitor and having a capacitance value same as that of the first capacitor.

Second aspect of the present invention is to provide a power factor correction circuit, the power factor correction circuit includes: a first AC terminal and a second AC terminal for receiving an AC voltage; a first DC terminal and a second DC terminal for providing a DC voltage; a first bridge arm comprising a first switch and a second switch connected in series, a first node between the first switch and the second switch electrically coupled to the first AC terminal through a first inductor; a second bridge arm comprising a third switch and a fourth switch connected in series, a second node between the third switch and the fourth switch electrically coupled to the second AC terminal, the first bridge arm and the second bridge arm connected in parallel between the first DC terminal and the second DC terminal; a second inductor having one terminal connected to the first AC terminal and another terminal connected to the first inductor; a first switching unit and a first capacitor connected in series, and electrically connected between the first DC terminal and a third node between the second inductor and the first inductor; and/or a second switching unit and a second capacitor connected in series, and electrically connected between the second DC terminal and the third node between the second inductor and the first inductor, wherein the first switching unit and/or the second switching unit are turned off under light-load or no-load.

Third aspect of the present invention is to provide a power factor correction circuit, the power factor correction circuit includes: a first AC terminal and a second AC terminal for receiving an AC voltage; a first DC terminal and a second DC terminal for supplying a DC voltage; a first bridge arm comprising a first switch and a second switch connected in series, a first node between the first switch and the second switch electrically coupled to the first AC terminal through a first inductor; a second bridge arm comprising a third switch and a fourth switch connected in series, a second node between the third switch and the fourth switch electrically coupled to the second AC terminal, the first bridge arm and the second bridge arm connected in parallel between the first DC terminal and the second DC terminal; a second inductor having a first terminal connected to a first terminal of the first inductor, and connected to the first node between the first switch and the second switch, wherein the first inductor and the second inductor are coupled inductors, and the first terminal of the second inductor and the first terminal of the first inductor are terminals of same magnetic polarity; a first capacitor and/or a second capacitor, the first capacitor having one end connected to a second terminal of the second inductor, and another end connected to the first DC terminal, the second capacitor having one end connected to the second terminal of the second inductor, and another end connected to the second DC terminal; and a third capacitor and/or a fourth capacitor, the third capacitor connected in parallel to the third switch based on an arrangement of the second capacitor and having a capacitance value same as that of the second capacitor, the fourth capacitor connected in parallel to the fourth switch based on an arrangement of the first capacitor and having a capacitance value same as that of the first capacitor.

Fourth aspect of the present invention is to provide a power factor correction circuit, the power factor correction circuit includes: a first AC terminal and a second AC terminal for receiving an AC voltage; a first DC terminal and a second DC terminal for supplying a DC voltage; a first bridge arm comprising a first switch and a second switch connected in series, a first node between the first switch and the second switch electrically coupled to the first AC terminal through a first inductor; a second bridge arm comprising a third switch and a fourth switch connected in series, a second node between the third switch and the fourth switch electrically coupled to the second AC terminal, the first bridge arm and the second bridge arm connected in parallel between the first DC terminal and the second DC terminal; a second inductor having a first terminal connected to a first terminal of the first inductor, and connected to the first node between the first switch and the second switch, wherein the first inductor and the second inductor are coupled inductors, and the first terminal of the second inductor and the first terminal of the first inductor are terminals of same magnetic polarity; a first switching unit and a first capacitor connected in series, and electrically connected between a second terminal of the second inductor and the first DC terminal; and/or a second switching unit and a second capacitor connected in series, and electrically connected between the second terminal of the second inductor and the second DC terminal, wherein the first switching unit and/or the second switching unit are turned off under light-load or no-load.

The power factor correction circuit of the present invention can effectively prevent the voltage of the bus capacitor under no-load or light-load from exceeding a peak value of AC voltage at the AC input terminal by keeping the capacitors of the diagonal position of the rectifier bridge to have the same capacitance value, or turning off the switching unit connected in series with the capacitor under no-load or light-load.

The present invention is applicable to the Totem-Pole PFC circuit, and facilitates to reduce a volume of the filter circuit while preventing the sharp increase of the output voltage under no-load or light-load.

The additional aspects and advantages of the present invention are partially explained in the below description, and partially becoming apparent from the description, or can be obtained through practice of the present invention.

BRIEF DESCRIPTION OF THE DRAWINGS

The exemplary embodiments will be described in detail with reference to the accompanying drawings, through which the above and other features and advantages of the present invention will become more apparent.

DETAILED EMBODIMENTS OF THE INVENTION

The exemplary embodiments will now be described more fully with reference to the accompanying drawings. However, the exemplary embodiments can be implemented in various forms and shall not be understood as being limited to the embodiments set forth herein; on the contrary, these embodiments are provided so that the invention will be thorough and complete, and the conception of exemplary embodiments will be fully conveyed to those skilled in the art. In the drawings, the same reference sign denotes the same or similar structure, so the detailed explanation will be omitted.

When element/component/and the like described and/or illustrated here are introduced, the phrases "one", "a(an)", "the", "said" and "at least one" refer to one or more elements/components/and the like. The terms "include", "comprise" and "have" refer to an open meaning without excluding additional element/component/and the like except for the listed element s/components/and the like. The relative phrases, such as, "upper" or "lower" used here may describe a relative relation of one component with respect to another component. It shall be understood that if the device illustrated in the drawing reverses to turn upside down, the component on an "upper" side will become a component on a "lower" side. In addition, the terms "first", "second" and the like in the claims are not numeral limitations to object.

Figure 1:
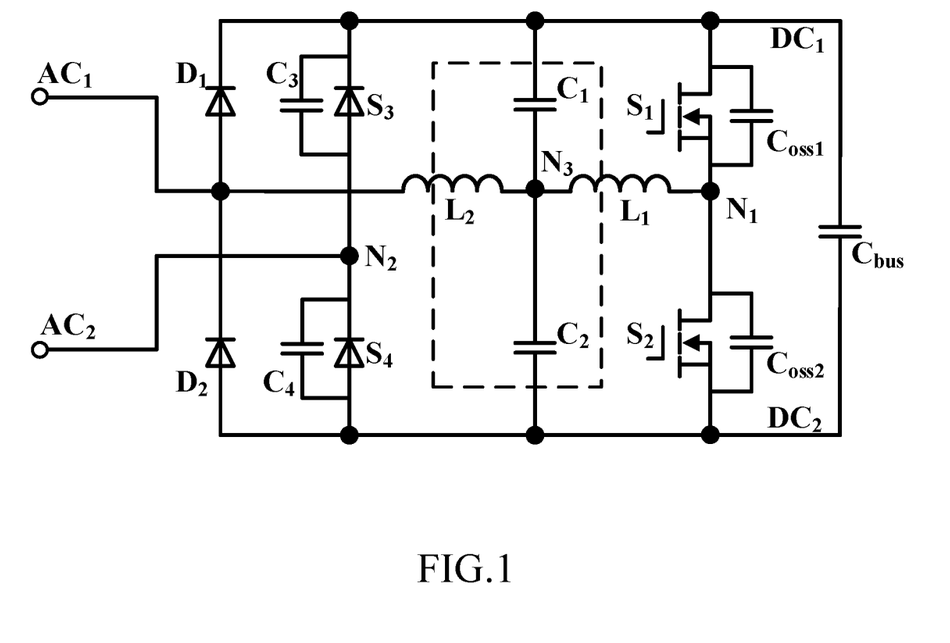
FIG. 1 is a schematic diagram of a circuit structure of a power factor correction circuit according to a first embodiment of the present invention.

FIG. 1 illustrates a circuit structure of a power factor correction circuit according to a first embodiment of the present invention. The power factor correction circuit includes a first AC terminal $AC_1$ and a second AC terminal $AC_2$ for receiving an AC voltage, and a first DC terminal $DC_1$ and a second DC terminal $DC_2$ for providing a DC voltage. The power factor correction circuit further includes a first bridge arm, a second bridge arm, a first inductor $L_1$ and a second inductor $L_2$. The first bridge arm includes a first switch $S_1$ and a second switch $S_2$ connected in series. A first node $N_1$ between the first switch $S_1$ and the second switch $S_2$ is electrically coupled to the first AC terminal $AC_1$ through the first inductor $L_1$ and the second inductor $L_2$. The second bridge arm includes a third switch $S_3$ and a fourth switch $S_4$ connected in series. A second node $N_2$ between the third switch $S_3$ and the fourth switch $S_4$ is electrically coupled to the second AC terminal $AC_2$. The first bridge arm and the second bridge arm are connected in parallel between the first DC terminal $DC_1$ and the second DC terminal $DC_2$. The second inductor $L_2$ has two terminals, one terminal connected to the first AC terminal $AC_1$ and another terminal connected to the first inductor $L_1$.

The power factor correction circuit further includes a first capacitor $C_1$ and a second capacitor $C_2$. The first capacitor $C_1$ has one end connected to a third node $N_3$ between the second inductor $L_2$ and the first inductor $L_1$, and another end connected to the first DC terminal $DC_1$. The second capacitor $C_2$ has one end connected to the third node $N_3$ between the second inductor $L_2$ and the first inductor $L_1$, and another end connected to the second DC terminal $DC_2$.

The power factor correction circuit further includes a third capacitor $C_3$ and a fourth capacitor $C_4$. The third capacitor $C_3$ is connected in parallel to the third switch $S_3$ based on an arrangement of the second capacitor $C_2$, and has a capacitance value same as that of the second capacitor $C_2$. The fourth capacitor $C_4$ is connected in parallel to the fourth switch $S_4$ based on an arrangement of the first capacitor $C_1$, and has a capacitance value same as that of the first capacitor $C_1$.

In the present invention, the power factor correction circuit may further include a first surge diode $D_1$ and a second surge diode $D_2$ connected in series. A cathode of the first surge diode $D_1$ is connected to the first DC terminal $DC_1$, an anode of the second surge diode $D_2$ is connected to the second DC terminal $DC_2$, and an anode of the first surge diode $D_1$ and a cathode of the second surge diode $D_2$ are connected to the first AC terminal $AC_1$.

In the present invention, the power factor correction circuit may further include a bus capacitor $C_{bus}$ electrically connected between the first DC terminal $DC_1$ and the second DC terminal $DC_2$.

In the embodiment of FIG. 1, the third switch $S_3$ and the fourth switch $S_4$, may be, for example, diodes. In other embodiment, the first switch $S_1$, the second switch $S_2$, the third switch $S_3$ and the fourth switch $S_4$ may be semiconductor switching devices, for example, including but not limited to MOSFETs, GaN devices, or SiC devices.

Figure 2:
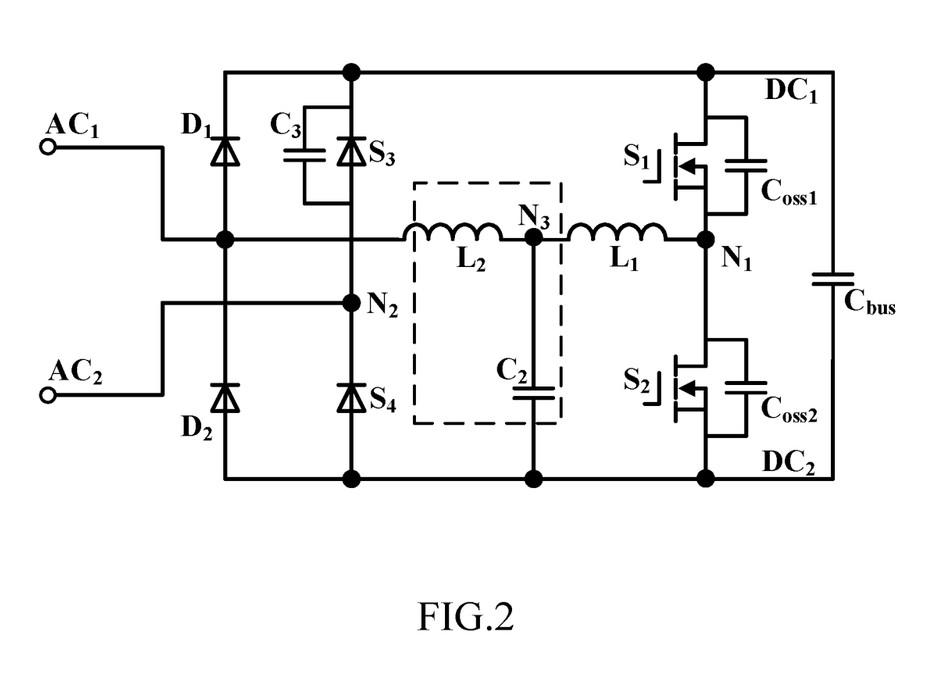
FIG. 2 is a schematic diagram of a circuit structure of a power factor correction circuit according to a second embodiment of the present invention.

FIG. 2 illustrates a circuit structure of a power factor correction circuit according to a second embodiment of the present invention, which differs from the embodiment of FIG. 1 in that the power factor correction circuit only includes the second capacitor $C_2$ and the third capacitor $C_3$ corresponding to the second capacitor $C_2$. The second capacitor $C_2$ has one end connected to the third node $N_3$ between the second inductor $L_2$ and the first inductor $L_1$, and another end connected to the second DC terminal $DC_2$. The third capacitor $C_3$ is connected in parallel to the third switch $S_3$ based on the arrangement of the second capacitor $C_2$, and has a capacitance value same as that of the second capacitor $C_2$.

Figure 3:
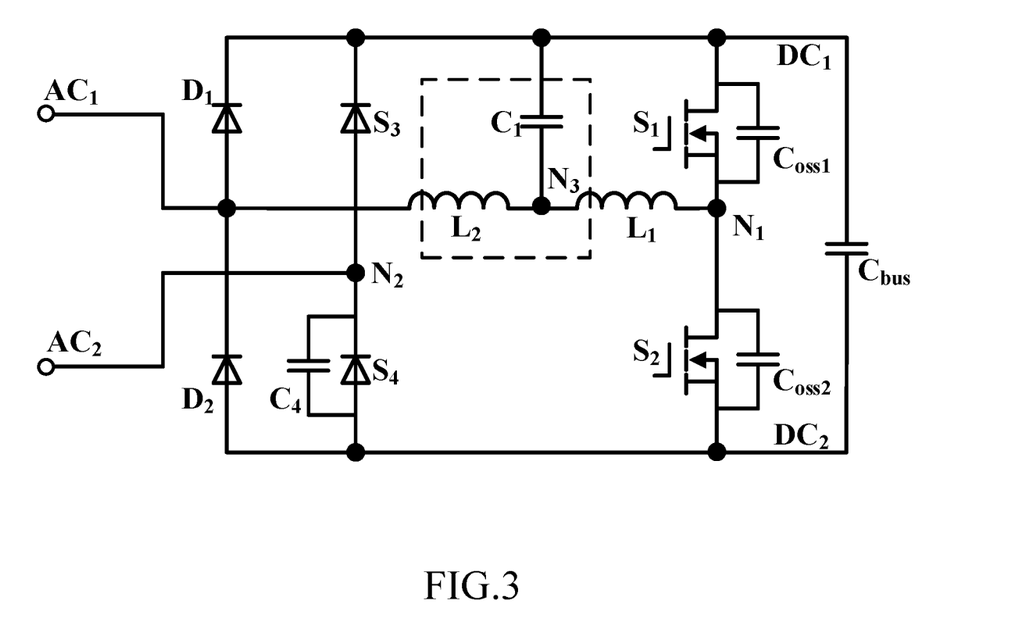
FIG. 3 is a schematic diagram of a circuit structure of a power factor correction circuit according to a third embodiment of the present invention.

FIG. 3 illustrates a circuit structure of a power factor correction circuit according to a third embodiment of the present invention, which differs from the embodiment of FIG. 1 in that the power factor correction circuit only includes the first capacitor $C_1$ and the fourth capacitor $C_4$ corresponding to the first capacitor $C_1$. The first capacitor $C_1$ has one end connected to the third node $N_3$ between the second inductor $L_2$ and the first inductor $L_1$, and another end connected to the first DC terminal $DC_1$. The fourth capacitor $C_4$ is connected in parallel to the fourth switch $S_4$ based on the arrangement of the first capacitor $C_1$, and has a capacitance value same as that the first capacitor $C_1$.

Figure 4:
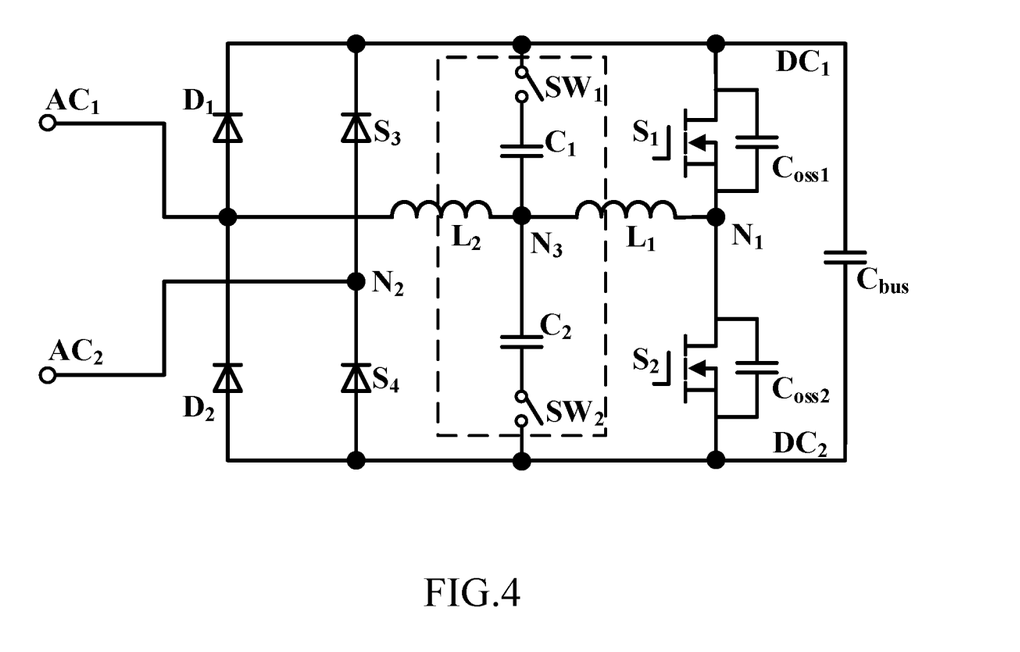
FIG. 4 is a schematic diagram of a circuit structure of a power factor correction circuit according to a fourth embodiment of the present invention.

FIG. 4 illustrates a circuit structure of a power factor correction circuit according to a fourth embodiment of the present invention, which differs from the embodiment of FIG. 1 in that the third capacitor $C_3$ and the fourth capacitor $C_4$ are omitted while the switching units connected in series to the first and second capacitors and turned off under no-load or light-load are provided. More specifically, the power factor correction circuit includes a first switching unit $SW_1$ and a first capacitor $C_1$ connected in series, and a second switching unit $SW_2$ and a second capacitor $C_2$ connected in series. The first switching unit $SW_1$ and the first capacitor $C_1$ are electrically connected between the first DC terminal $DC_1$ and the third node $N_3$ between the second inductor $L_2$ and the first inductor $L_1$. The second switching unit $SW_2$ and the second capacitor $C_2$ are electrically connected between the second DC terminal $DC_2$ and the third node $N_3$ between the second inductor $L_2$ and the first inductor $L_1$. The first switching unit $SW_1$ and the second switching unit $SW_2$ are turned off under light-load or no-load.

Figure 5:
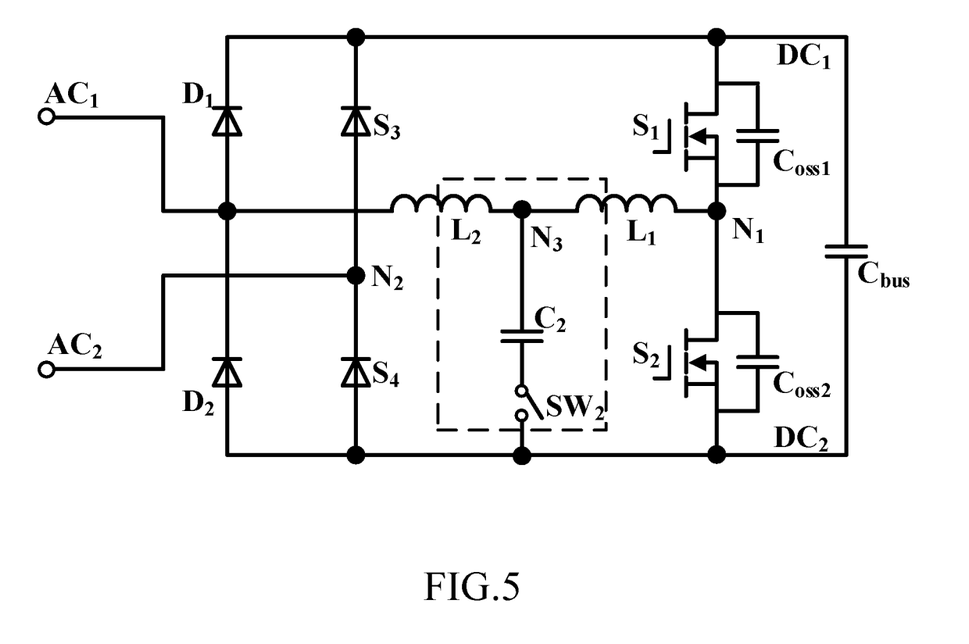
FIG. 5 is a schematic diagram of a circuit structure of a power factor correction circuit according to a fifth embodiment of the present invention.

FIG. 5 illustrates a circuit structure of a power factor correction circuit according to a fifth embodiment of the present invention, which differs from the embodiment of FIG. 4 in that the power factor correction circuit only includes the second switching unit $SW_2$ and the second capacitor $C_2$ connected in series. The second switching unit $SW_2$ and the second capacitor $C_2$ are electrically connected between the second DC terminal $DC_2$ and the third node $N_3$ between the second inductor $L_2$ and the first inductor $L_1$. The second switching unit $SW_2$ is turned off under light-load or no-load.

Figure 6:
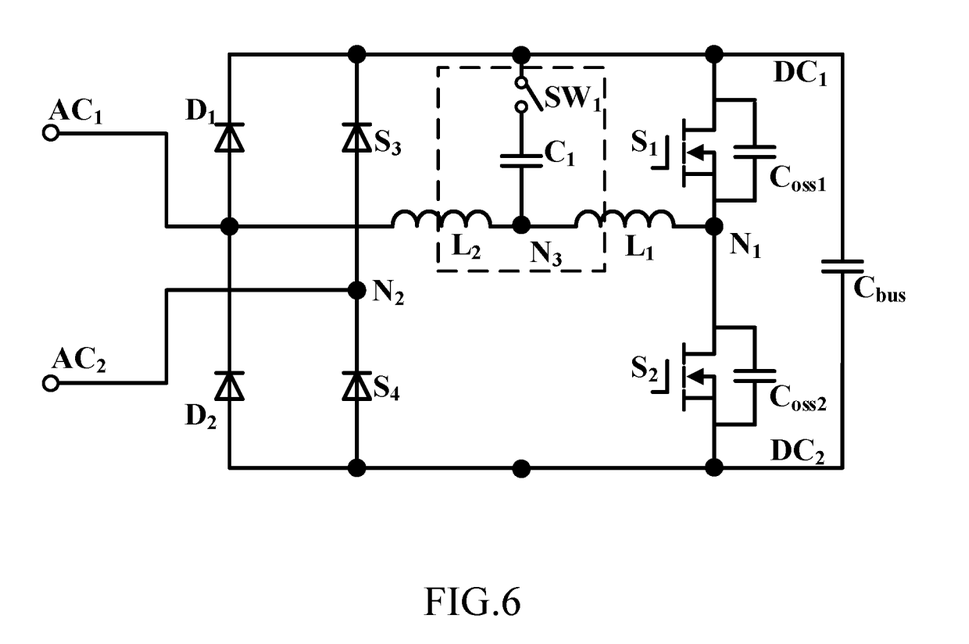
FIG. 6 is a schematic diagram of a circuit structure of a power factor correction circuit according to a sixth embodiment of the present invention.

FIG. 6 illustrates a circuit structure of a power factor correction circuit according to a sixth embodiment of the present invention, which differs from the embodiment of FIG. 4 in that the power factor correction circuit only includes the first switching unit $SW_1$ and the first capacitor $C_1$ connected in series. The first switching unit $SW_1$ and the first capacitor $C_1$ are electrically connected between the first DC terminal $DC_1$ and the third node $N_3$ between the second inductor $L_2$ and the first inductor $L_1$. The first switching unit $SW_1$ is turned off under light-load or no-load.

In some embodiments, the first switching unit and the second switching unit may include one or more switches.

In some embodiments, a load less than 50% of a rated load may be considered as the light-load, but the present application is not limited thereto. In some embodiments, light-load may refer to a load less than 30%, 20% or 5% of the rated load.

Figure 7:
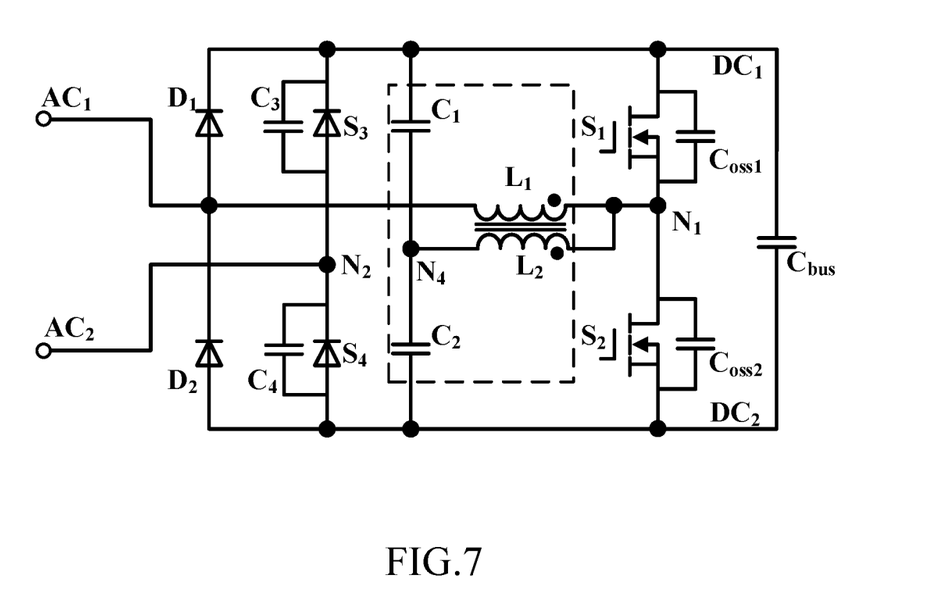
FIG. 7 is a schematic diagram of a circuit structure of a power factor correction circuit according to a seventh embodiment of the present invention.

FIG. 7 illustrates a circuit structure of a power factor correction circuit according to a seventh embodiment of the present invention, which differs from the embodiment of FIG. 1 in that the first node $N_1$ between the first switch $S_1$ and the second switch $S_2$ of the first bridge arm of the power factor correction circuit is electrically connected to the first AC terminal $AC_1$ through the first inductor $L_1$, i.e., the first inductor $L_1$ has a first terminal connected to the first node $N_1$ and a second terminal connected to the first AC terminal $AC_1$; a first terminal of the second inductor $L_2$ is connected to the first terminal of the first inductor $L_1$, and connected to the first node $N_1$ between the first switch $S_1$ and the second switch $S_2$; the first capacitor $C_1$ has one end connected to a second terminal $N_4$ of the second inductor $L_2$ and another end connected to the first DC terminal $DC_1$; and the second capacitor $C_2$ has one end connected to the second terminal $N_4$ of the second inductor $L_2$ and another end connected to the second DC terminal $DC_2$. In the embodiment of FIG. 7, the power factor correction circuit further includes a third capacitor $C_3$ and a fourth capacitor $C_4$. The third capacitor $C_3$ is connected in parallel to the third switch $S_3$ based on an arrangement of the second capacitor $C_2$, and has a capacitance value same as that of the second capacitor $C_2$. The fourth capacitor $C_4$ is connected in parallel to the fourth switch $S_4$ based on an arrangement of the first capacitor $C_1$, and has a capacitance value same as that of the first capacitor $C_1$. The first inductor $L_1$ and the second inductor $L_2$ are coupled inductors, and the first terminal of the first inductor $L_1$ and the first terminal of the second inductor $L_2$ are terminals of same magnetic polarity.

Figure 8:
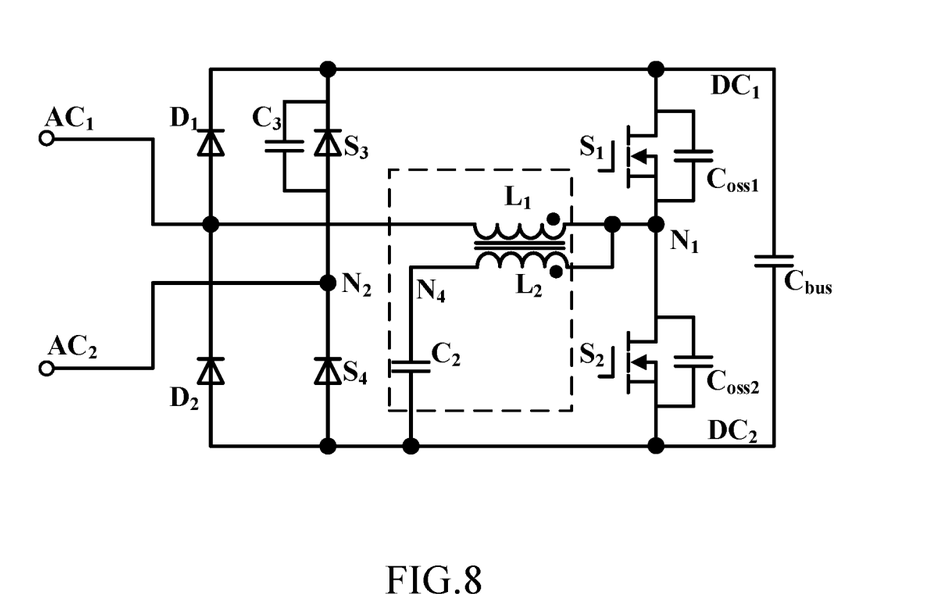
FIG. 8 is a schematic diagram of a circuit structure of a power factor correction circuit according to an eighth embodiment of the present invention.

FIG. 8 illustrates a circuit structure of a power factor correction circuit according to an eighth embodiment of the present invention, which differs from the embodiment of FIG. 7 in that the power factor correction circuit only includes the second capacitor $C_2$ and the third capacitor $C_3$ corresponding to the second capacitor $C_2$. The second capacitor $C_2$ has one end connected to the second terminal $N_4$ of the second inductor $L_2$, and another end connected to the second DC terminal $DC_2$. The third capacitor $C_3$ is connected in parallel to the third switch $S_3$ based on the arrangement of the second capacitor $C_2$, and has a capacitance value same as that of the second capacitor $C_2$.

Figure 9:
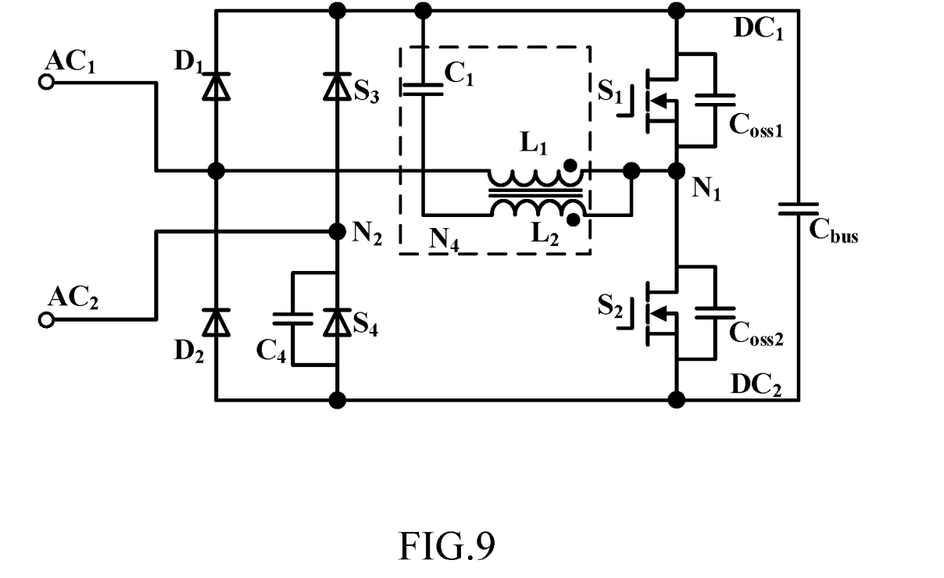
FIG. 9 is a schematic diagram of a circuit structure of a power factor correction circuit according to a ninth embodiment of the present invention.

FIG. 9 illustrates a circuit structure of a power factor correction circuit according to a ninth embodiment of the present invention, which differs from the embodiment of FIG. 7 in that the power factor correction circuit only includes the first capacitor $C_1$ and the fourth capacitor $C_4$ corresponding to the first capacitor $C_1$. The first capacitor $C_1$ has one end connected to the second terminal $N_4$ of the second inductor $L_2$, and another end connected to the first DC terminal $DC_1$. The fourth capacitor $C_4$ is connected in parallel to the fourth switch $S_4$ based on the arrangement of the first capacitor $C_1$, and has a capacitance value same as that of the first capacitor $C_1$.

Figure 10:
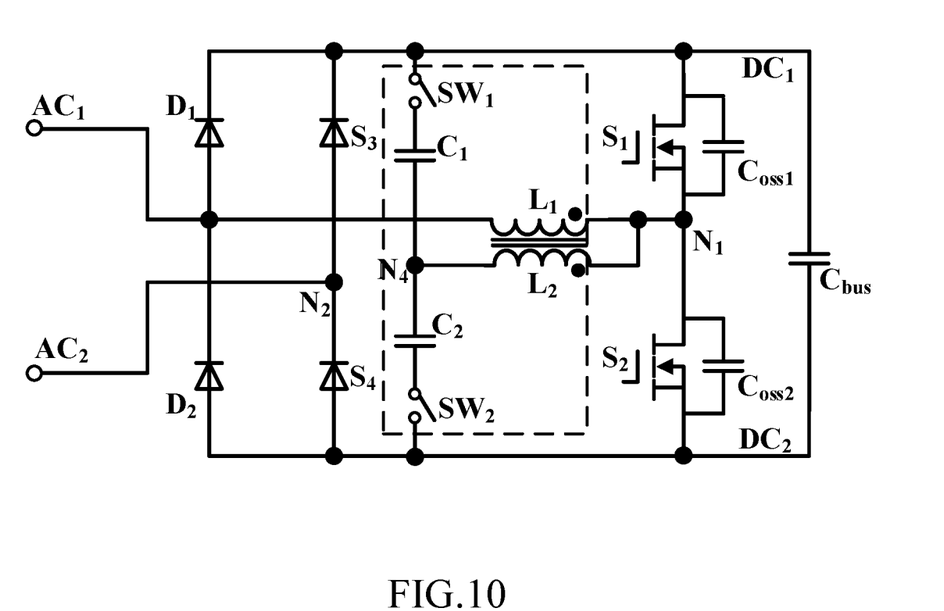
FIG. 10 is a schematic diagram of a circuit structure of a power factor correction circuit according to a tenth embodiment of the present invention.

FIG. 10 illustrates a circuit structure of a power factor correction circuit according to a tenth embodiment of the present invention, which differs from the embodiment of FIG. 7 in that the third capacitor $C_3$ and the fourth capacitor $C_4$ are omitted while the switching units connected in series to the first and second capacitors and turned off under no-load or light-load are provided. More specifically, the power factor correction circuit includes a first switching unit $SW_1$ and a first capacitor $C_1$ connected in series, and a second switching unit $SW_2$ and a second capacitor $C_2$ connected in series. The first switching unit $SW_1$ and the first capacitor $C_1$ are electrically connected between the second terminal $N_4$ of the second inductor $L_2$ and the first DC terminal $DC_1$. The second switching unit $SW_2$ and the second capacitor $C_2$ are electrically connected between the second terminal $N_4$ of the second inductor $L_2$ and the second DC terminal $DC_2$. The first switching unit $SW_1$ and the second switching unit $SW_2$ are turned off under light-load or no-load.

Figure 11:
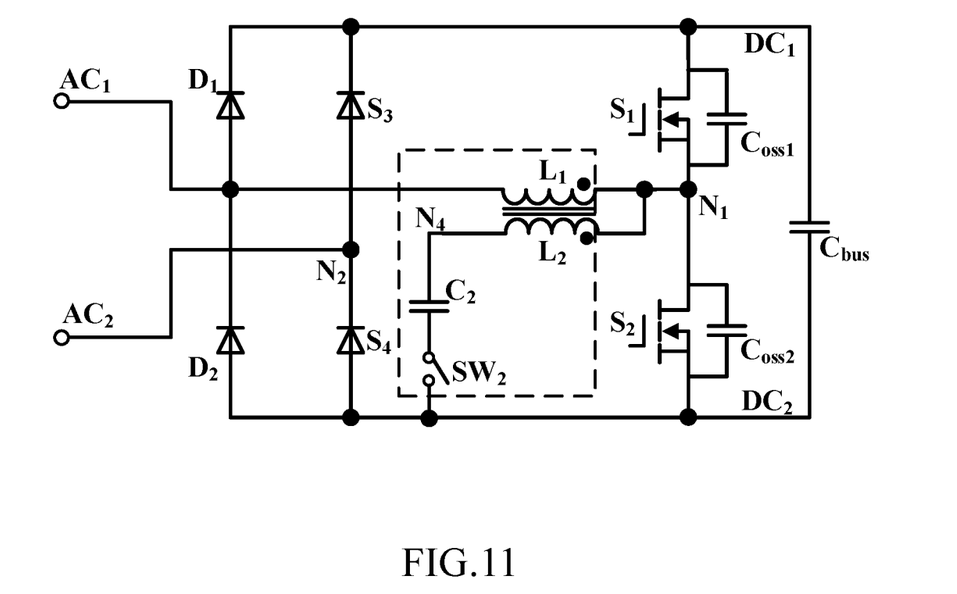
FIG. 11 is a schematic diagram of a circuit structure of a power factor correction circuit according to an eleventh embodiment of the present invention.

FIG. 11 illustrates a circuit structure of a power factor correction circuit according to an eleventh embodiment of the present invention, which differs from the embodiment of FIG. 10 in that the power factor correction circuit only includes the second switching unit $SW_2$ and the second capacitor $C_2$ connected in series. The second switching unit $SW_2$ and the second capacitor $C_2$ are electrically connected between the second terminal $N_4$ of the second inductor $L_2$ and the second DC terminal $DC_2$. The second switching unit $SW_2$ is turned off under light-load or no-load.

Figure 12:
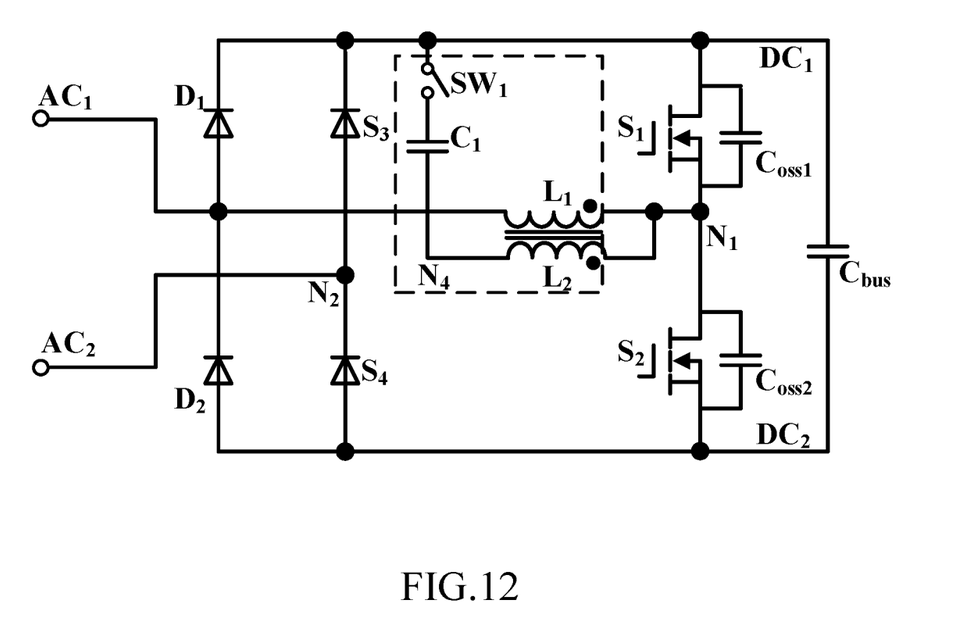
FIG. 12 is a schematic diagram of a circuit structure of a power factor correction circuit according to a twelfth embodiment of the present invention.

FIG. 12 illustrates a circuit structure of a power factor correction circuit according to a twelfth embodiment of the present invention, which differs from the embodiment of FIG. 10 in that the power factor correction circuit only includes the first switching unit $SW_1$ and the first capacitor $C_1$ connected in series. The first switching unit $SW_1$ and the first capacitor $C_1$ are electrically connected between the second terminal $N_4$ of the second inductor $L_2$ and the first DC terminal $DC_1$. The first switching unit $SW_1$ is turned off under light-load or no-load.

In some embodiments, the first switching unit and the second switching unit may include one or more switches.

Similarly, a load less than 50% of a rated load may be considered as the light-load, but the present application is not limited thereto. In some embodiments, the light-load may refer to a load less than 30%, 20% or 5% of the rated load. In the above embodiments, the third switch $S_3$ and the fourth switch $S_4$ may be, for example, diodes. In other embodiment, the first switch $S_1$, the second switch $S_2$, the third switch $S_3$ and the fourth switch $S_4$ may be semiconductor switching devices, for example, including but not limited to MOSFETs, GaN devices, or SiC devices.

Figure 13A:
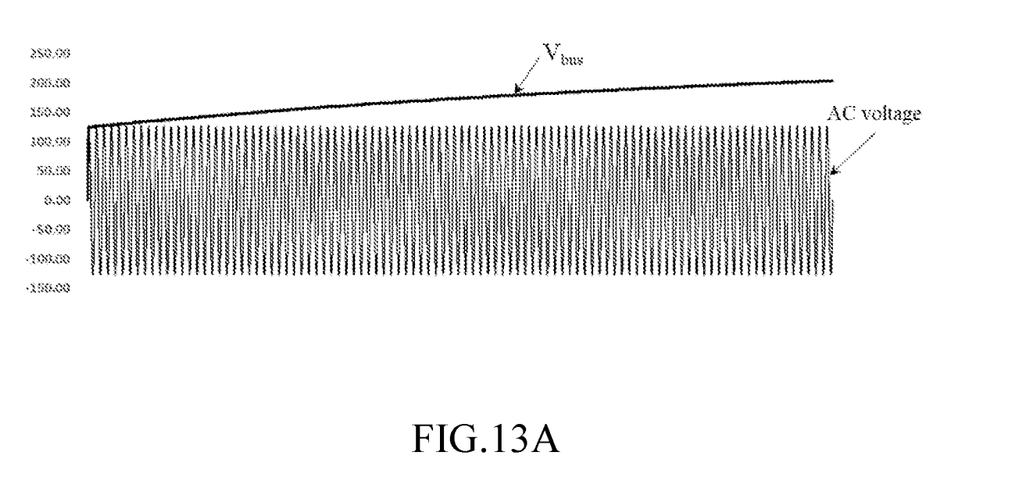
FIG. 13A is a schematic diagram of a voltage waveform of a bus capacitor of a power factor correction circuit according to the prior art.
Figure 13B:
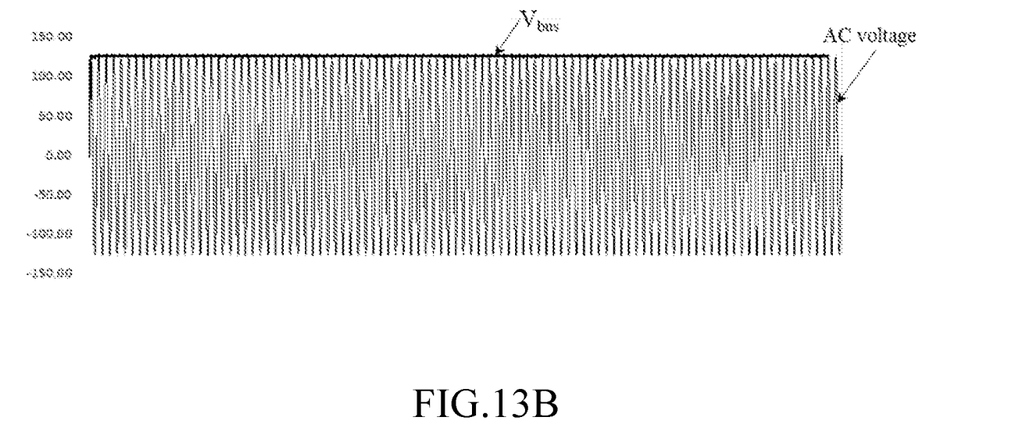
FIG. 13B is a schematic diagram of a voltage waveform of a bus capacitor of a power factor correction circuit according to the present invention.

FIG. 13A is a schematic diagram of a voltage waveform of bus capacitor of a power factor correction circuit according to the prior art, and FIG. 13B is a schematic diagram of a voltage waveform of bus capacitor of a power factor correction circuit according to the present invention. As shown in FIGS. 13A and 13B, when the circuit is under no-load or light-load, a voltage $V_{bus}$ of the bus capacitor $C_{bus}$ of the prior art increases, but a voltage $V_{bus}$ of the bus capacitor $C_{bus}$ of the present invention does not increase, such that the bus capacitor can be effectively protected. The power factor correction circuit of the present invention can effectively prevent the voltage of the bus capacitor from increasing abnormally when the circuit is under no-load or light-load by keeping the capacitors of the diagonal position of the rectifier bridge to have the same capacitance value, or by connecting the switching unit in series to the capacitor and turning off the switching unit under no-load or light-load.

The present invention is applicable to the Totem-Pole PFC circuit, and facilitates to reduce a volume of the filter circuit while preventing a sharp increase of the output voltage of the bus capacitor under no-load or light-load.

Exemplary embodiments of the present invention have been shown and described above. It shall be understood that the present invention is not limited to the disclosed embodiments. Instead, the present invention intends to cover various modifications and equivalents included in the spirit and scope of the appended claims.

What is claimed is:

1. A power factor correction circuit, comprising:
    a first AC terminal and a second AC terminal for receiving an AC voltage;
    a first DC terminal and a second DC terminal for providing a DC voltage;
    a first inductor;
    a first bridge arm comprising a first switch and a second switch connected in series, a first node between the first switch and the second switch electrically coupled to the first AC terminal through the first inductor;
    a second bridge arm comprising a third switch and a fourth switch connected in series, a second node between the third switch and the fourth switch electrically coupled to the second AC terminal, wherein the first bridge arm and the second bridge arm are connected in parallel between the first DC terminal and the second DC terminal;
    a second inductor having one terminal connected to the first AC terminal, and another terminal connected to the first inductor;
    a first capacitor and/or a second capacitor, the first capacitor having one end connected to a third node between the second inductor and the first inductor and another end connected to the first DC terminal, the second capacitor having one end connected to the third node between the second inductor and the first inductor and another end connected to the second DC terminal; and
    a third capacitor and/or a fourth capacitor, the third capacitor connected in parallel to the third switch based on an arrangement of the second capacitor and having a capacitance value same as that of the second capacitor, the fourth capacitor connected in parallel to the fourth switch based on an arrangement of the first capacitor and having a capacitance value same as that of the first capacitor.

2. The power factor correction circuit of claim 1, further comprising a first surge diode and a second surge diode connected in series, a cathode of the first surge diode connected to the first DC terminal, an anode of the second surge diode connected to the second DC terminal, and an anode of the first surge diode and a cathode of the second surge diode connected to the first AC terminal.

3. The power factor correction circuit of claim 1, further comprising a bus capacitor electrically connected between the first DC terminal and the second DC terminal.

4. The power factor correction circuit of claim 1, wherein each of the third switch and the fourth switch is a diode.

5. The power factor correction circuit of claim 1, wherein each of the first switch, the second switch, the third switch and the fourth switch is a semiconductor switching device including a MOSFET, a GaN device, or a SiC device.

6. A power factor correction circuit, comprising:
    a first AC terminal and a second AC terminal for receiving an AC voltage;
    a first DC terminal and a second DC terminal for providing a DC voltage;
    a first inductor;
    a first bridge arm comprising a first switch and a second switch connected in series, a first node between the first switch and the second switch electrically coupled to the first AC terminal through the first inductor;
    a second bridge arm comprising a third switch and a fourth switch connected in series, a second node between the third switch and the fourth switch electrically coupled to the second AC terminal, wherein the first bridge arm and the second bridge arm are connected in parallel between the first DC terminal and the second DC terminal;
    a second inductor having one terminal connected to the first AC terminal and another terminal connected to the first inductor;
    a first switching unit and a first capacitor connected in series, and electrically connected between the first DC terminal and a third node between the second inductor and the first inductor; and/or
    a second switching unit and a second capacitor connected in series, and electrically connected between the second DC terminal and the third node between the second inductor and the first inductor,
    wherein the first switching unit and/or the second switching unit are turned off under light-load or no-load.

7. The power factor correction circuit of claim 6, further comprising a bus capacitor electrically connected between the first DC terminal and the second DC terminal.

8. The power factor correction circuit of claim 6, further comprising a first surge diode and a second surge diode connected in series, a cathode of the first surge diode connected to the first DC terminal, an anode of the second surge diode connected to the second DC terminal, and an anode of the first surge diode and a cathode of the second surge diode connected to the first AC terminal.

9. The power factor correction circuit of claim 6, wherein each of the third switch and the fourth switch is a diode.

10. The power factor correction circuit of claim 6, wherein each of the first switch, the second switch, the third switch and the fourth switch is a semiconductor switching device including a MOSFET, a GaN device, or a SiC device.

11. A power factor correction circuit, comprising:
    a first AC terminal and a second AC terminal for receiving an AC voltage;
    a first DC terminal and a second DC terminal for supplying a DC voltage;
    a first inductor;
    a first bridge arm comprising a first switch and a second switch connected in series, a first node between the first switch and the second switch electrically coupled to the first AC terminal through the first inductor;
    a second bridge arm comprising a third switch and a fourth switch connected in series, a second node between the third switch and the fourth switch electrically coupled to the second AC terminal, wherein the first bridge arm and the second bridge arm are connected in parallel between the first DC terminal and the second DC terminal;
    a second inductor having a first terminal connected to a first terminal of the first inductor and connected to the first node between the first switch and the second switch, wherein the first inductor and the second inductor are coupled inductors, and the first terminal of the second inductor and the first terminal of the first inductor are terminals of same magnetic polarity;
    a first capacitor and/or a second capacitor, the first capacitor having one end connected to a second terminal of the second inductor and another end connected to the first DC terminal, the second capacitor having one end connected to the second terminal of the second inductor and another end connected to the second DC terminal; and
    a third capacitor and/or a fourth capacitor, the third capacitor connected in parallel to the third switch based on an arrangement of the second capacitor and having a capacitance value same as that of the second capacitor, the fourth capacitor connected in parallel to the fourth switch based on an arrangement of the first capacitor and having a capacitance value same as that of the first capacitor.

12. The power factor correction circuit of claim 11, further comprising a bus capacitor electrically connected between the first DC terminal and the second DC terminal.

13. The power factor correction circuit of claim 11, further comprising a first surge diode and a second surge diode connected in series, a cathode of the first surge diode connected to the first DC terminal, an anode of the second surge diode connected to the second DC terminal, and an anode of the first surge diode and a cathode of the second surge diode connected to the first AC terminal.

14. The power factor correction circuit of claim 11, wherein each of the third switch and the fourth switch is a diode.

15. The power factor correction circuit of claim 11, wherein each of the first switch, the second switch, the third switch and the fourth switch is a semiconductor switching device including a MOSFET, a GaN device, or a SiC device.

16. A power factor correction circuit, comprising:
a first AC terminal and a second AC terminal for receiving an AC voltage;
a first DC terminal and a second DC terminal for providing a DC voltage;
a first inductor;
a first bridge arm comprising a first switch and a second switch connected in series, a first node between the first switch and the second switch electrically coupled to the first AC terminal through the first inductor;
a second bridge arm comprising a third switch and a fourth switch connected in series, a second node between the third switch and the fourth switch electrically coupled to the second AC terminal, wherein the first bridge arm and the second bridge arm are connected in parallel between the first DC terminal and the second DC terminal;
a second inductor having a first terminal connected to a first terminal of the first inductor and connected to the first node between the first switch and the second switch, wherein the first inductor and the second inductor are coupled inductors, and the first terminal of the second inductor and the first terminal of the first inductor are terminals of same magnetic polarity;
a first switching unit and a first capacitor connected in series, and electrically connected between a second terminal of the second inductor and the first DC terminal; and/or
a second switching unit and a second capacitor connected in series, and electrically connected between the second terminal of the second inductor and the second DC terminal,
wherein the first switching unit and/or the second switching unit are turned off under light-load or no-load.

17. The power factor correction circuit of claim 16, further comprising a bus capacitor electrically connected between the first DC terminal and the second DC terminal.

18. The power factor correction circuit of claim 16, further comprising a first surge diode and a second surge diode connected in series, a cathode of the first surge diode connected to the first DC terminal, an anode of the second surge diode connected to the second DC terminal, and an anode of the first surge diode and a cathode of the second surge diode connected to the first AC terminal.

19. The power factor correction circuit of claim 16, wherein each of the third switch and the fourth switch is a diode.

20. The power factor correction circuit of claim 16, wherein each of the first switch, the second switch, the third switch and the fourth switch is a semiconductor switching device including a MOSFET, a GaN device, or a SiC device.

* * * * *

UNITED STATES PATENT AND TRADEMARK OFFICE
CERTIFICATE OF CORRECTION

PATENT NO. : 11,489,440 B2
APPLICATION NO. : 17/146471
DATED : November 1, 2022
INVENTOR(S) : Haibin Song et al.

It is certified that error appears in the above-identified patent and that said Letters Patent is hereby corrected as shown below:

On the Title Page

The Title of Invention and in the Specification, Column 1, Line 1, should read as:
"TOTEM POLE POWER FACTOR CORRECTION CIRCUIT" rather than "POWER FACTOR CORRECTION CIRCUIT".

Signed and Sealed this
Twenty-fourth Day of January, 2023

Katherine Kelly Vidal
*Director of the United States Patent and Trademark Office*